United States Patent
Bär et al.

(10) Patent No.: US 7,164,925 B2
(45) Date of Patent: Jan. 16, 2007

(54) METHOD AND DEVICE FOR POSITIONAL DETERMINATION OF USER APPLIANCES IN A RADIO COMMUNICATION SYSTEM USING ADDITIONAL POSITIONAL ELEMENTS IN NEIGHBORING RADIO CELLS

(75) Inventors: Siegfried Bär, Unterschleissheim (DE); Thomas Gottschalk, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/484,338

(22) PCT Filed: Jul. 2, 2002

(86) PCT No.: PCT/DE02/00386

§ 371 (c)(1),
(2), (4) Date: Jan. 20, 2004

(87) PCT Pub. No.: WO03/009625

PCT Pub. Date: Jan. 30, 2003

(65) Prior Publication Data

US 2004/0235495 A1 Nov. 25, 2004

(30) Foreign Application Priority Data

Jul. 17, 2001 (DE) .................. 101 34 589

(51) Int. Cl.
*H04Q 7/20* (2006.01)

(52) U.S. Cl. .............................. 455/456.5; 455/456.1; 455/456.6

(58) Field of Classification Search ............. 455/456.1, 455/456.2, 456.3, 456.5, 456.6
See application file for complete search history.

(56) References Cited

U.S. PATENT DOCUMENTS

| 5,901,358 A | * | 5/1999 | Petty et al. ............... 455/456.2 |
| 6,157,842 A | | 12/2000 | Karlsson et al. |
| 6,950,663 B1 | * | 9/2005 | Pihl et al. ................ 455/456.1 |
| 2002/0102980 A1 | * | 8/2002 | Jokinen ...................... 455/450 |

FOREIGN PATENT DOCUMENTS

| EP | 1 091 611 | 4/2001 |
| WO | WO 00/69199 | 11/2000 |

OTHER PUBLICATIONS

XP-002215742—Universal Mobile Telecommunications System (UMTS), Stage 2 Functional Specification of UE Positioning in UTRAN Mar. 2001.

* cited by examiner

*Primary Examiner*—Nick Corsaro
*Assistant Examiner*—Olivia Marsh
(74) *Attorney, Agent, or Firm*—Bell, Boyd & Lloyd LLC

(57) ABSTRACT

A method and system are provided for positional determination of at least one user appliance in a radio communication system, which includes a number of base stations for dividing into radio cells, in which at least one localization measuring signal is transmitted by at least one positional element from at least one radio cell adjacent to the radio cell in which the user apparatus is located.

14 Claims, 4 Drawing Sheets

METHOD AND DEVICE FOR POSITIONAL
DETERMINATION OF USER APPLIANCES
IN A RADIO COMMUNICATION SYSTEM
USING ADDITIONAL POSITIONAL
ELEMENTS IN NEIGHBORING RADIO
CELLS

BACKGROUND OF THE INVENTION

The present invention relates to a method for determining the position of at least one subscriber device of a radio communication system which has a number of base stations respectively associated with a number of radio cells, with at least one locating measuring signal being transmitted by at least one additional position element.

In radio communication systems, such as, for example, those according to the GSM or UMTS standard, it may, if appropriate, be of interest to determine the current location of a specific subscriber device; in particular, a mobile radio device. The requirement of the position of the respective subscriber device to be determined may arise from the respective subscriber himself/herself, from another subscriber or from the network infrastructure side.

SUMMARY OF THE INVENTION

The present invention, therefore, is directed toward a method and system in which the position of the respective subscriber device in a radio communication system can be determined as efficiently as possible. This is achieved in a method of the type mentioned at the beginning, and in an associated system, by virtue of the fact that at least one locating measuring signal is transmitted by at least one position element from at least one radio cell which is adjacent to the radio cell in which the subscriber device to be respectively located is present, and is used to determine the position of the subscriber device in the radio cell in which it is located at that particular time. As a result of the fact that in each case at least one locating measuring signal is transmitted by at least one position element in one or more neighboring radio cells, it is not necessary for position elements to be additionally provided in the radio cell in which the actual subscriber device to be located is present at that particular time. This permits effective utilization of any position elements which are already present. Supplementary applications for the radio network infrastructure can thus be dispensed with.

Additional features and advantages of the present invention are described in, and will be apparent from, the following Detailed Description of the Invention and the Figures.

BRIEF DESCRIPTION OF THE FIGURES

Elements with the same functioning and method of operation are respectively provided with the same reference symbols in FIGS. 1 to 5.

DETAILED DESCRIPTION OF THE
INVENTION

Figure 4:
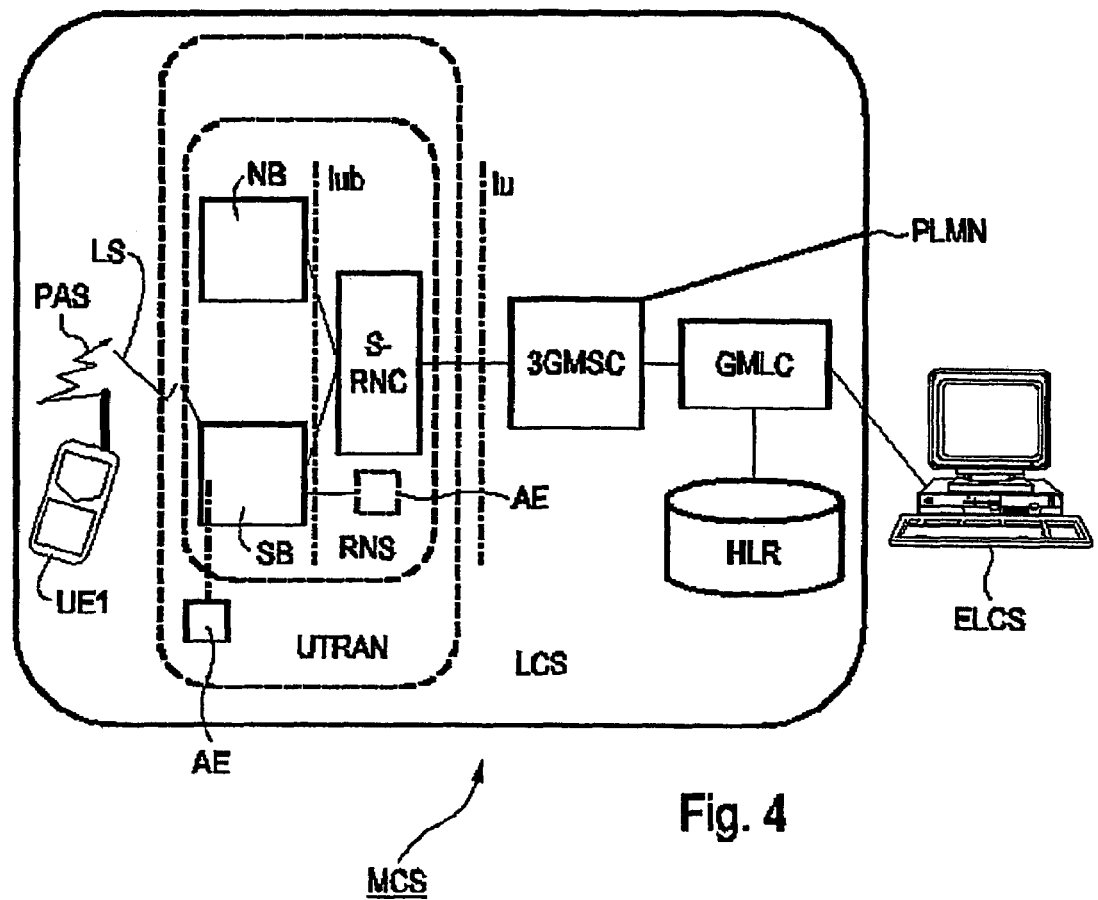
FIG. 4 is a schematic view of the further components of the radio communication system according to FIG. 1.

The functional components of a cellular radio communication system MCS are illustrated schematically in FIG. 4, in which telecommunication signals are transmitted via at least one predefined air interface (LS1) between at least one subscriber device, in particular a mobile radio device such as, for example, UE1, and at least one base station such as, for example, NB, SB using a time-division multiplex multiple-access transmission method. The system is preferably embodied as a mobile radio system according to the UMTS (Universal Mobile Telecommunication System) standard. Here, telecommunication signals are transmitted via the respective air interface, in particular in accordance with a combined TDMA/CDMA multiple-access transmission method (TDMA=Time Division Multiple Access; CDMA=Code Division Multiple Access). In particular, it is operated in what is referred to as the TDD (Time Division Duplex) mode. In the TDD mode, a separate signal for transmission is brought about in the uplink and downlink directions (Uplink=signal transmission from the mobile radio device to the respective base station, Downlink=signal transmission from the respectively assigned base station to the mobile radio device) via a corresponding, separate allocation of time slots using a time-division multiplex method. Here, preferably only a single carrier frequency is used for signal transmission in the uplink and downlink directions. In order to be able to bring about subscriber separation, the telecommunication signals are, expressed in simple terms, divided over time into a number of successive time slots with a predefinable time period with a predefinable time frame structure during the radio transmission via the air interface of the respective subscriber device to the assigned base station (and visa versa). A number of subscribers, which communicate simultaneously in the same radio cell with the respectively associated base station, are separated, in combination with the time multiplex division, from one another in terms of their telecommunication/data connections via orthogonal codes; in particular, using what is referred to as the CDMA (Code Division Multiple Access) method.

The subscriber devices provided are preferably mobile radio telephones; in particular, mobile phones. In addition, it is also possible for other telecommunication and/or data transmission devices with assigned radio unit (transmitter and/or receiver unit) such as, for example, an internet computer, television sets, notebooks, fax machines, etc., to be embodied for "on air" communications traffic (i.e., via an air interface), and for them to be components of the radio communication network. The subscriber devices may, if appropriate, also be arranged here in a stationary, or fixed, fashion in the radio network. Preferably, they also may be of portable design and thus can be mobile; i.e., be used in different locations.

The cellular mobile system MCS usually has a number of base stations which are each assigned mobile radio cells; i.e., each base station produces one radio cell and supplies it, in terms of radio traffic, via at least one air interface. Within such a radio cell, its base station is therefore respectively responsible for communication with a subscriber device which is respectively present therein. The respective base station is preferably arranged approximately in the center of its radio cell.

Here, in the exemplary embodiment in FIG. 4, only two base stations NB, SB are shown for the sake of clarity, the base stations being representative of the number of other base stations which are present in the radio network. A subscriber device UE1 which is to be located is present in the radio cell of the base station SB. In particular, the subscriber device UE1 (User Equipment) expressed in general terms, is a physically mobile, (i.e., portable) terminal, for telecommunication. A base station is in each case a network component which serves and, if appropriate, monitors mobile terminals in a mobile radio cell of at least one air interface.

The base station SB in FIG. 4 is that network component which is currently serving and monitoring the mobile terminal UE1 to be located in the radio cell in which it is present at that particular time; i.e., a serving mobile radio cell), via the air interface LS. The base stations such as, for example, NB, SB can in turn be combined into groups and connected via a fixed network connection Iub to a subordinate network unit SRNC (Serving Radio Network Controller) which, using a protocol RRC (Radio Resource Control=protocol for transmitting messages between a mobile subscriber device and Serving Radio Network Controller), organizes and monitors the communication/data traffic between the respective mobile subscriber device and the respectively assigned base station. What is referred to as a Serving Radio Network Controller is, therefore, a network component for serving and monitoring one or more base stations which are called NodeBs in UMTS. The respective Serving Radio Network Controller and the base stations assigned to it form what is referred to as a Radio Network System (RNS).

A number of RNS systems are, in turn, combined in UMTS to form a logic system unit UTRAN (Universal Terrestial Radio Access Network). The switching unit 3GMSC (3rd Generation Mobile-services Switching Center) establishes the interface between the radio system MSC and fixed networks such as, for example, PLMN (Public Land Mobile Network) via a fixed link Iu. The MSC carries out all the necessary functions relating to this for circuit switched services from and to the mobile stations. A communications link for an external location application (e.g., position determining) or an external location client (LCS client) is made possible via a connection unit GMLC (Gateway Mobile Location Center). This connection unit GMLC is connected to what is referred to as a "Home Location Register" HLR to which a mobile user is assigned for protocol and monitoring purposes (e.g., user information). An external locating unit such as, for example, a LCS client ELCS (location services) application system (e.g., emergency call centers, monitoring centers, position-dependent information services) can enter into contact with the radio communication system MCS via the connection unit GMLC.

In the traffic state which is given by way of example in FIG. 4, the mobile radio device UE1 has already set up an active, existing communication link to the base station SB in the radio cell in which it is located at that particular time. As a result, telecommunication signals or data signals can be transmitted both from the base station SB to the mobile radio device UE1 (=downlink) and from the mobile radio device UE1 to the base station SB (=uplink). An evaluation/arithmetic unit AE (shown by dot dashed lines) is connected to the base station SB using network elements which are not shown in FIG. 4 for the sake of clarity. The unit AE can be used to carry out the calculation or determination of positions (PCF=Position Calculating Function) of the mobile radio device UE1 on the basis of the measurement data. This evaluation/calculation unit AE also may be implemented as a component of the respective base station and/or in the mobile radio device UE1 itself.

According to one mobile radio standard of the third generation, such as UMTS (see WCDMA for UMTS—Radio Access for Third Generation Mobile Communications: H. Holma, A. Toskala; John Wiley & Sons, New York; ISBN 0-47172-051-8; 2000), the position of a mobile radio device can be determined using the support of what are referred to as position elements. More details on this are given in 3G TSGR1#8(99)g57: Positioning method proposal, PANASONIC, New York (USA), TSG RAN1 Meeting#8, 12–15.10.1999, 3G TSGR2#8(99)e48: Positioning method proposal, PANASONIC, Cheju (Korea), TSG RAN2 Meeting#8, 2–5.11.1999 and 3G TSGR2#15-R2-001718: Assessment procedure for the OTDOA-PE positioning method, PANASONIC, Sophia Antipolis (France), TSG RAN2 Meeting#15, 21–25.8.2000.

Figure 2:
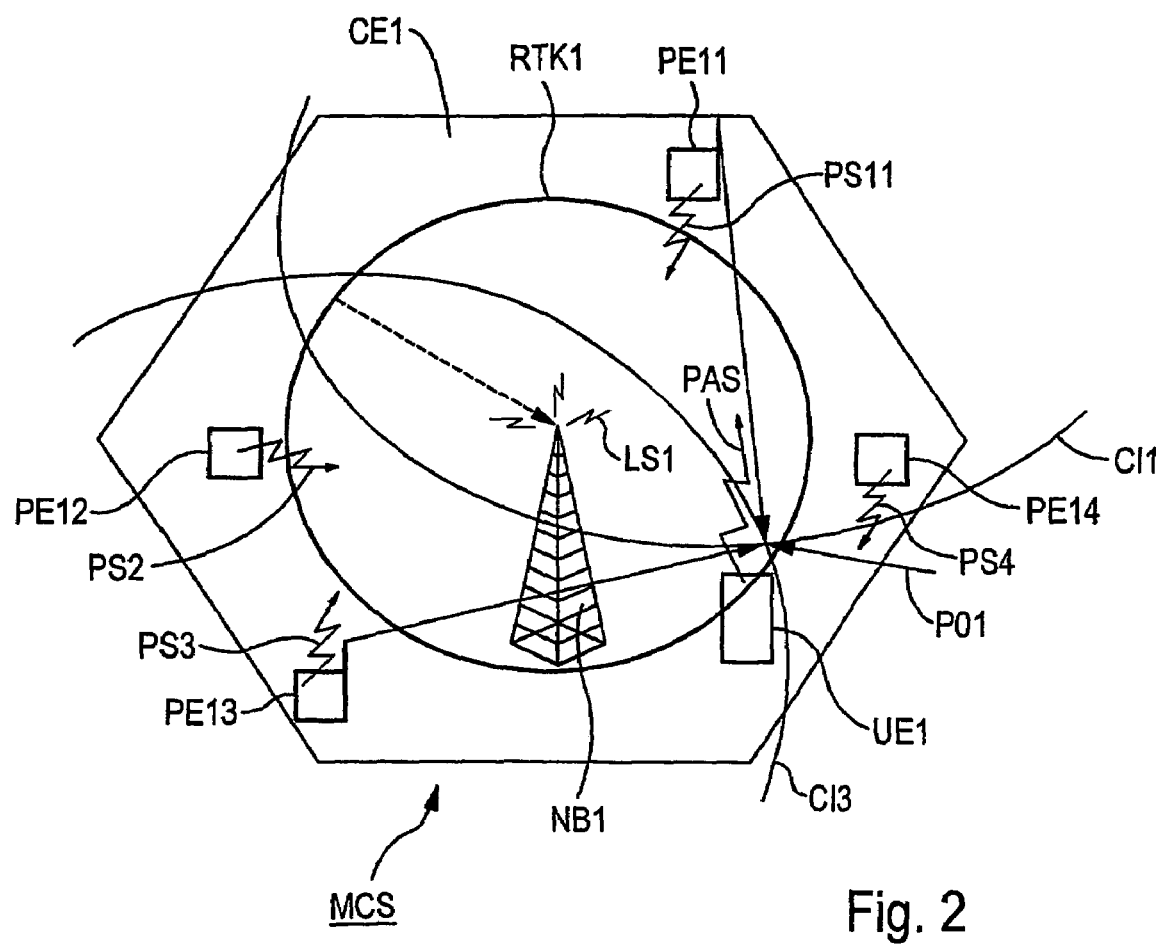
FIG. 2 is a schematic view of a radio cell of a radio communication system in which position elements arranged in the radio cell can be used in a known fashion to determine the position of a mobile radio device which is located therein.

FIG. 2 shows, by way of example, the radio cell CE1 from the number of radio cells of the radio communication system according to FIG. 4. This individual radio cell CE1 is supplied, in terms of radio equipment, by the approximately centrally arranged base station NB1. Expressed in general terms, in a cellular mobile radio system such as, for example, UMTS, base stations or NodeBs produce associated, individually assigned mobile radio cells. Within a mobile radio cell, a subscriber device can have a radio link to the base station which produces this cell. A number of other radio cells are thus adjacent to the respective radio cell such as, for example, CE1, the radio cells each being produced by an individual base station. These have been omitted in FIG. 2 for the sake of simplicity. In order to be able to determine the position, or location, of the mobile radio device UE1 which is present in the radio cell CE1 at a given time, in each case one or more position elements such as, for example, PE11 to PE14 are additionally arranged distributed in the respective individual radio cell such as, for example, CE1 itself.

The position elements are preferably placed in the region of the external boundaries of the radio cell CE1. In order to determine the position of the mobile radio device UE1, on the one hand, the base station NB1 itself transmits, via its air interface LS1, one or more locating measuring signals whose transit time is measured for its transit path to the mobile radio device UE1, and determines therefrom a distance circle RTK1 around the base station NB1 as a center point (what is referred to as RTT (round trip time) measurement). The mobile radio device UE1 is located on this circle RTK with a constant radius. On the other hand, in order to further delimit its location, one or more locating measuring signals are transmitted simultaneously, or each offset chronologically by a known time period, by at least two further position elements such as, for example PE1 and PE3. At least two further distance circles CI1 and CI3 are determined via the mobile radio device UE1, using corresponding transit time measurements of these locating measuring signals. Here, the distance circle CI1 characterizes those locations at which a locating measuring signal of the position element PE1 has in each case, the same transit time for its transit path to the mobile radio device UE1. The distance circle CI2 describes those locations at which a locating measuring signal of position element PE2 has, in each case, the same transit time for its transit path to the mobile radio device UE1. Only the point of intersection of all three distant circles RTK1, CI1, CI2 gives the location of the mobile radio device UE1 unambiguously.

The position elements PE11 to PE14 are expediently synchronized with respect to the timing pattern of the radio signaling on the air interface LS1 of the base station NB1. This is because, in this way, the starting time of the locating measuring signals of the position elements is defined unambiguously, which facilitates the evaluation of the transit times of the locating measuring signals.

Instead of the distance circles RTK1, CI1, CI2 and/or in combination with them, it is also possible to determine local hyperbolas on the basis of the transit time of the locating measuring signals, as in what is referred to as the OTDOA (Observed Time of Arrival) method. More details on this known OTDOA position element measuring method (OTDOA=Observed Time Difference of Arrival) can be found in 3G TSGR1#8(99)g57: Positioning method proposal, PANASONIC, New York (USA), TSG RAN1 Meeting#8, 12–15.10.1999, 3G TSGR2#8(99)e48: Positioning method proposal PANASONIC, Cheju (Korea), TSG RAN2 Meeting#8, 2–5.11.1999, 3G TSGR2#15-R2-001718: Assessment procedure for the OTDOA-PE positioning method, PANASONIC, Sophia Antipolis (France), TSG RAN2 Meeting#15, 21–25.8.2000. The determination of the position in accordance with the OTDOA method is based, in particular, on measurement of signals of the air interface between a number of base stations (NodeBs) and/or position elements in the respective radio cell in which a subscriber device is present, and the subscriber device which is to be respectively located. According to this method, the subscriber device which is to be located attempts to detect at least one pair of a known signal, for example from two adjacent base stations at different locations, and/or position elements within the respective radio cell in which a subscriber device is present. The reception times of the signal of two adjacent NodeBs which are at different locations and/or position elements of the same radio cell in which the subscriber device is present are then preferably transmitted, for evaluation purposes, to the respective evaluation unit PCF (Position Calculation Function) of that base station (Serving NodeB) which is responsible for the subscriber device to be located. Evaluation refers to the PCF forming the difference between the reception times ΔT. This ΔT describes a hyperboloid which specifies that the location in which the subscriber device to be located is present is on a hyperbola (see Taschenbuch der Mathematik: I. N. Bonstein, K. A. Semendjajew, G. Musiol, H. Muhlig; Verlag [publishing house] Harri Deutsch; 4th edition: 1999). As a result of at least one further adjacent base station and/or one further position element of the same radio cell in which a subscriber is present being included, the location in which the searched-for subscriber device is present is, thus, on one of the two points of intersection of two hyperbolas. A further item of information is also necessary for an unambiguous determination position. For example, it is possible either:

a) to determine an OTDOA measurement with respect to a fourth NodeB and/or with respect to a further position element of the same radio cell in which the subscriber device is present (results in a third hyperbola); and/or b) in cells with sectorization, the information relating to the sector in which the subscriber device is located can be used to arrive at a decision; and/or c) an RTT measurement can be carried out.

The locating measuring signal which is to be respectively detected may be the signal of what is referred to as the CPICH (Common Pilot Channel) which is continuously transmitted by the NodeBs. In order to distinguish between the CPICH signals, each NodeB and/or each position element is expediently assigned a different spread code. As such, it is possible to differentiate the received CPICH signals, to assign them to the corresponding NodeBs or position elements, and to calculate the necessary time differences.

The synchronization of the NodeBs with one another also influences the calculation of positions. Here, the PCF is informed whether the NodeBs are synchronized. If they are not, it is advantageous for the chronological shift which is present between the individual NodeBs to be signaled to the adjacent base stations. Possible chronological shifts with respect to the transmission times can then be included in the calculations for the sake of correct calculation processes. The background to this is that, for the calculation of position, it is thus possible to assume that the locating measuring signals from the various base stations have been output into the network at approximately the same time. Using the OTDOA method, anaccuracy in the position determination of the UE of approximately 80–100 m is preferably obtained.

In an expansion of the OTDOA method for the case in which the signals of the NodeB which serves the UE overlap with the locating measuring signals of the other NodeBs, in what is referred to as the OTDOA-IPDL method (Observed Time Difference of Arrival-Idle Period Downlink), the transmissions of the NodeB (which are used by the UE which is to be located—referred to as serving NodeB), are switched off for short time periods, IPDLs. Otherwise, a detection of the respective CPICH signal of other NodeBs would in fact be made more difficult and even be impossible over wide parts of the mobile radio cell. These additionally inserted pauses in relation to the transmission of this NodeB can then be utilized by the UE in order to detect the reception times of the CPICH signals of the adjacent NodeB. This pause (idle period) may be several symbols long, generally 5–10 symbols. Here, the length of one symbol corresponds, for example, in the FDD mode of UMTS to 256 chips, and in the TDD mode to a max of 16 chips, 1 chip being approximately 0.26 µs long (given a chip frequency of 3.84 Mchips/s). Owing to the introduction of the IPDLs and, thus, the deactivation of the transmission of signals of the NodeB of interest, a capacity loss or information loss occurs in the corresponding mobile radio cell for the time of the IPDLs. Using the OTDOA-IPDL method, an accuracy in the determination of position of up to approximately 20 m is obtained. A corresponding procedure is also preferably adopted if position elements are additionally used in the respective radio cell in which the device is present at that particular time.

The number of position elements is defined by the network operator in accordance with the local conditions of the respective mobile radio cell and the required accuracy of the determination of position for each individual radio cell. With the previous locating method, it is only possible with the PEs to use, for position-determining purposes, the signals of only that mobile radio cell in which the mobile radio device to be determined is located at that particular time. Signals from other NodeBs (in the adjacent mobile radio cells) for the OTDOA evaluation are basically no longer necessary but can, of course, be used nevertheless when they are present and detected. The insertion of IPDLs is no longer absolutely necessary, something which avoids the capacity loss of the cell which is mentioned in the OTDOA-IPDL method (see above).

Theoretically, in this method IPDLs also can increase inaccuracies further. The PEs have two main functions:

a) they listen to the mobile radio cell traffic in the DL (down-link), to the transmission from the NodeB to the UEs; and b) they each transmit a predefined signal code, assigned to each PE, to the UEs in the DL.

The listening and transmitting are each carried out at a frequency, the downlink frequency of the mobile radio cell (serving cell); for example, the frequency of the broadcast channel BCH. However, both operations, of listening and transmitting, are separated from one another chronologically so that overlapping cannot and should not occur.

If a request for position determination of a subscriber device (UE) is present in a cell, the PEs which are respectively present in the mobile radio cell are informed by the serving NodeB (via higher signaling layers or via the BCH), to transmit their assigned signal code in a specific downlink slot (DL slot). The transmission takes place at specific times and in specific, free signal sections of the DL slot of the transmission signal of the serving NodeB to the UEs; i.e., the PEs place their uniquely defined signal code sequences in signal sections, predefined by the serving NodeB, of the signaling of the serving NodeB to the UEs of this mobile radio cell (see PS1 in FIG. 5). It is possible, for example, for these to be signal sections of the BCH which are not used by it or signal sections in the data parts such as, for example, DA1 of a slot (time slot) such as, for example, SLi. The UE which is to be located is, of course, also aware of the signal sections in which the PEs transmit their signal codes. As a result, the UE can attempt, in accordance with the signaling time, to detect the signal codes of the PEs in the specific part of the DL slot and in doing so determine the arrival times of the signal codes. The further procedure and determination of the position takes place in accordance with the OTDOA method specified above, according to FIGS. 2 and 4.

To summarize, the essence of this known position-determining method is that one or more position elements (PE), with whose support position determinations can be carried out according to the principle of the OTDOA method, are introduced per mobile radio cell. The number of position elements is defined by the network operator, preferably in accordance with the local conditions (for example, topography) of the respective mobile radio cell and the required accuracy of the position determining process.

With the PEs it is possible to use, for position-determining purposes, the signals of only that mobile radio cell in which the UE to be determined is present. Signals of other NodeBs (in the adjacent mobile radio cells) for the OTDOA evaluation are basically no longer necessary. However, they also can, of course, be used if they are present and detected.

In the PE method which is described above, PEs can be introduced into each mobile radio cell. The decision in this respect is taken by the mobile radio network operator. Various points are to be taken into account here:

1) Number of the PEs in view of costs:

a) PEs are to be seen, depending on their method of operation, as "slimmed down" or very simple mobile radio devices with the minimum functions of listening to a frequency and transmitting a fixed signal code into the mobile radio space at one frequency.

b) Despite "slimming down" (reduced functionality), the PEs entail specific costs (procurement, energy consumption, location).

2) Use as a supplement to the NodeBs for covering only specific regions with the PEs so that PEs possibly are not present in each mobile radio cell but rather only in specific regions, for example:

a) Indoor areas b) gaps between tall buildings c) mountainous countryside 3) geographic and/or legal conditions in the mobile radio cell; for example, possible prohibition against installing PEs.

A further problem is the possible, if not proven, health risks of mobile radio waves in heavily populated areas or the like. For all the abovementioned reasons, it is acceptable or imaginable that PEs of the cellular radio communication network will not be present in each mobile radio cell. This could then have negative effects in terms of the determination of the position of one or more UEs and its accuracy in the these mobile radio cells which are without position elements.

Despite these conditions (i.e., mixture of radio cells with and without additional position element), it is possible to carry out the determination of the position of a subscriber device over a large area by using the locating measuring signals of one or more position elements in adjacent radio cells for evaluation in those radio cells in which no position elements, or too few position elements, are present. In other words, use is made of PE elements in radio cells which are adjacent to the radio cell in which the subscriber device to be respectively located is present at that particular time (but without support, or with insufficient support by position elements in the radio cell (serving cell) in which the UE to be located is present at that particular time (see FIGS. 1 and 3). For the case just mentioned in which PEs are not present or there is an inadequate supply of PEs in the respective serving cell, one or more PEs are, therefore, stationed in one or more adjacent cells and their locating measuring signals are used for the determination of position. As a result, such gaps in provision are closed.

As the assignment of the maximum 240 signal codes (in particular, the 240 unused S-SCH codes (Secondary Synchronization Channels); in UMTS, of 256 channels made available only 16 are allocated and used) to corresponding PEs of the mobile radio network is known in advance to the UEs via the BCH (transmitted by the NodeBs or the higher signaling layers in the case of, for example, the first radio contact=logging on), it is possible for the UEs in the serving cell to listen to the signal codes of the PEs from the adjacent cells.

The quintessence of the solution to the above problems is, in particular, the use of position elements of the adjacent cells in the serving cell, or preferably via the uniquely defined signal codes which are assigned to them and known in advance, for determining the position of UEs in the serving cell. The determination of the position advantageously can be carried out here in accordance with the OTDOA method.

In this way, on the one hand, the costs of the network operators can be reduced by virtue of a smaller number of necessary position elements in the radio communications network. Adverse effects in terms of the availability and accuracy of the determination of position are thus, largely avoided. A further advantage is that failure times of PEs of whatever kind in the serving cell can be compensated using PEs in the adjacent mobile radio cells. Position calculations, therefore, continue to be possible. A main advantage is, in particular, the more effective planning of the locations of the PEs. Associated with this are the already-mentioned savings in PEs in the entire network. The locations of the PEs can be particularly selected such that, in the one mobile radio cell, PEs are located more toward the edge of the cell, and in the adjacent cells they are located more in the direction of NodeB or more in the direction of the local features which cause problems in terms of the geographic conditions (see FIG. 3). With the use of PEs from the adjacent mobile radio cells it is also possible to avoid, decrease or attenuate geographic, legal or health problems relating to the installation of PEs in some mobile radio cells.

With the present method it is possible to dispense with IPDLs (as in the OTDOA-IPDL method). As a result, the loss of capacity can be avoided because of possible IPDLs. Therefore, it is possible for the network operator to reach his/her target capacity, even with the feature "determining the position of UEs."

Exemplary Embodiment 1

Figure 1:
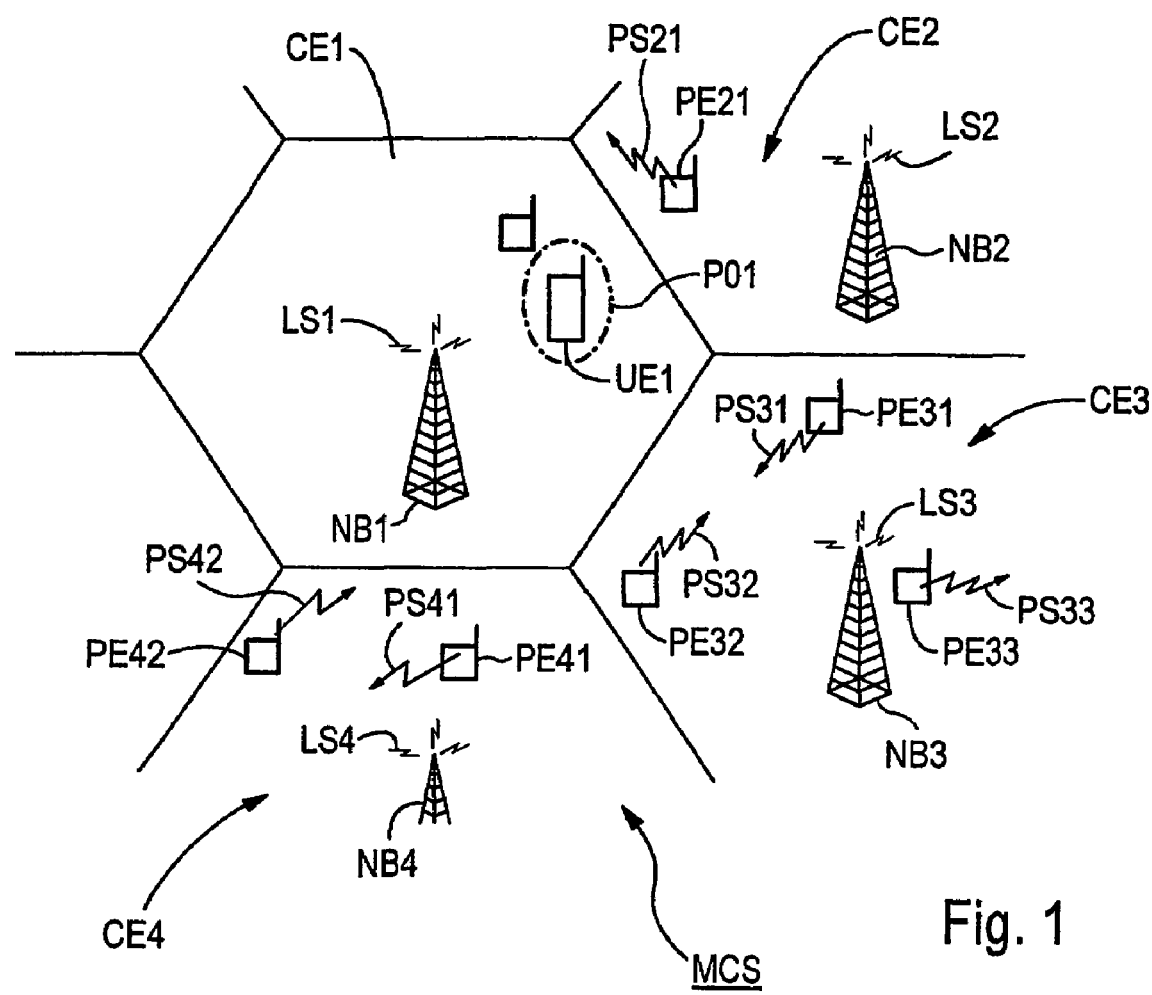
FIG. 1 is a schematic view of a number of radio cells of a radio communication system in which the position of a mobile radio device which is to be located can be determined according to a first embodiment of the method according to the present invention only using position elements in radio cells which are adjacent to the radio cell in which the mobile radio device to be located is present at that particular time.

In the first exemplary embodiment, FIG. 1 serves as a basis for the explanations. It is assumed that, by way of example, four base stations NB1, NB2, NB3 and NB4 cover the UMTS mobile radio cells CE1, CE2, CE3 and CE4. Further adjacent cells will not have any role in the first exemplary embodiment, for the sake of clarity. These NodeBs are monitored and served by a RNC, thus giving rise to a system including monitoring element, base stations, mobile radio device and position elements (the RNC is the superordinate monitoring unit for a specific number of NodeBs and is not explicitly specified in FIG. 1).

Furthermore it is assumed that a mobile radio device UE1 which is to be located is present in the UMTS mobile radio cell CE1 (the serving cell) and is supplied or served by this base station or NodeB NB1. Here, it is not relevant whether the interrogation as to the determination of the position starts from the mobile radio device UE1 or from the network and, thus, from any interrogating client in the network.

The hexagonal mobile radio cell which is shown in FIG. 1 represents an abstraction for the sake of better presentation of the arrangement of a mobile radio cell and its elements.

Furthermore, a certain number of PEs are present in the adjacent mobile radio cells CE2, CE3 and CE4, while no position elements are positioned in the radio cell (serving cell) CE1 in which the device is present at that given time. In detail, the additional position elements PE21, PE22 are arranged in the adjacent radio cell CE2, the position elements PE31, PE32 in the adjacent radio cell CE3, and the position elements PE41, PE42 in the adjacent radio cell CE4. The PE distribution in the mobile radio cells CE2, CE3 and CE4 is performed in such a way that the locating measuring signals of the PEs of these adjacent radio cells, in this example the UMTS mobile radio cells CE2, CE3 and CE4, can be satisfactorily "heard" (i.e., detected), in the serving cell of the subscriber device UE1 to be located. In general, this refers to the PEs preferably being stationed in the vicinity of the cell boundary, near to the serving cell. Here, the distribution is preferably configured such that the locating measuring signals of all the PEs in total cover, as far as possible, 100% of the UMTS mobile radio cell CE1 in which the device is located at that particular time.

If, for example, the subscriber device UE1 which is to be located is present in the mobile radio cell CE1 near to its upper left-hand corner, it is possible that the subscriber device UE1 can evaluate measurement signals of the position elements PE21 and PE42 during a position interrogation. On the other hand, problems will and can occur with respect to the detection of the locating measuring signals of the other PEs (PE31, PE32, PE41) because these PEs are difficult for the subscriber device UE1 to be located to detect, or cannot be detected at all. The reasons are the relatively large distances and, as a result, weaker signal powers and possibly a greater quantity of shadowing in the distance between these PEs and the subscriber device UE1.

If the subscriber device UE1 is, according to FIG. 1, approximately in the center of the right-hand half of the UMTS mobile radio cell CE1, it is possible for it to detect the signal code sequences of the position elements PE21, PE31, PE32 and PE42 of the adjacent radio cells CE2, CE3, CE4 to a degree lying between satisfactory and very satisfactory, while the position element PE42 is already too far away for sufficiently good reception. A possible sequence for the determination of the position of the subscriber device UE1 could be, by way of example, as follows:

The position of the subscriber device UE1 in the UMTS mobile radio cell CE1 is to be determined; it is not relevant here why there was a position interrogation or where it came from. Owing to the position-determining accuracy which is defined in the requirements, the RNC will decide to use position elements (PEs). After this, the base station NB1 of the radio cell CE1 in which the device is present will be informed by the RNC. Via the BCH, radio cell CE1 informs the PEs of the adjacent mobile radio cells, CE2, CE3 and CE4 of the position interrogation and the times at which the respective position element inserts its signal code sequence, assigned to it, into the DL slot structure of the NodeBs NB1 for the subscriber device UE1. In the first instance, the fact that the PEs are situated in the vicinity of the cell boundary of the UMTS mobile radio cell CE1, and thus also receive the DL traffic, ensures that the position elements (PEs) in the adjacent cells are provided with this information. In the second instance, the RNC ensures that the adjacent NodeBs also integrate this information into their DL traffic. The subscriber device UE1 is also provided with this information as the DL link of the serving nodeB NB1 also hears this. At the given times, the position elements PE21, PE31, PE32 and PE41 then insert their signal code sequences into the respective DL slot structure. The subscriber device UE1 then attempts to determine reception times of the code sequences using the knowledge of the signal code sequences and of the associated position element (via, for example, a rake receiver (i.e., correlation receiver), with which time shifts can be determined by correlations). This information is transmitted by the subscriber device UE1 to the serving nodeB NB1. From this, nodeB NB1 then determines time differences between the reception time points of the PE signal code sequences. These differences are mapped onto hyperbolas using the OTDOA method; the common point of intersection of the hyperbolas is the searched-for position in an accuracy value range which is dependent on the surroundings.

Exemplary Embodiment 2

Figure 3:
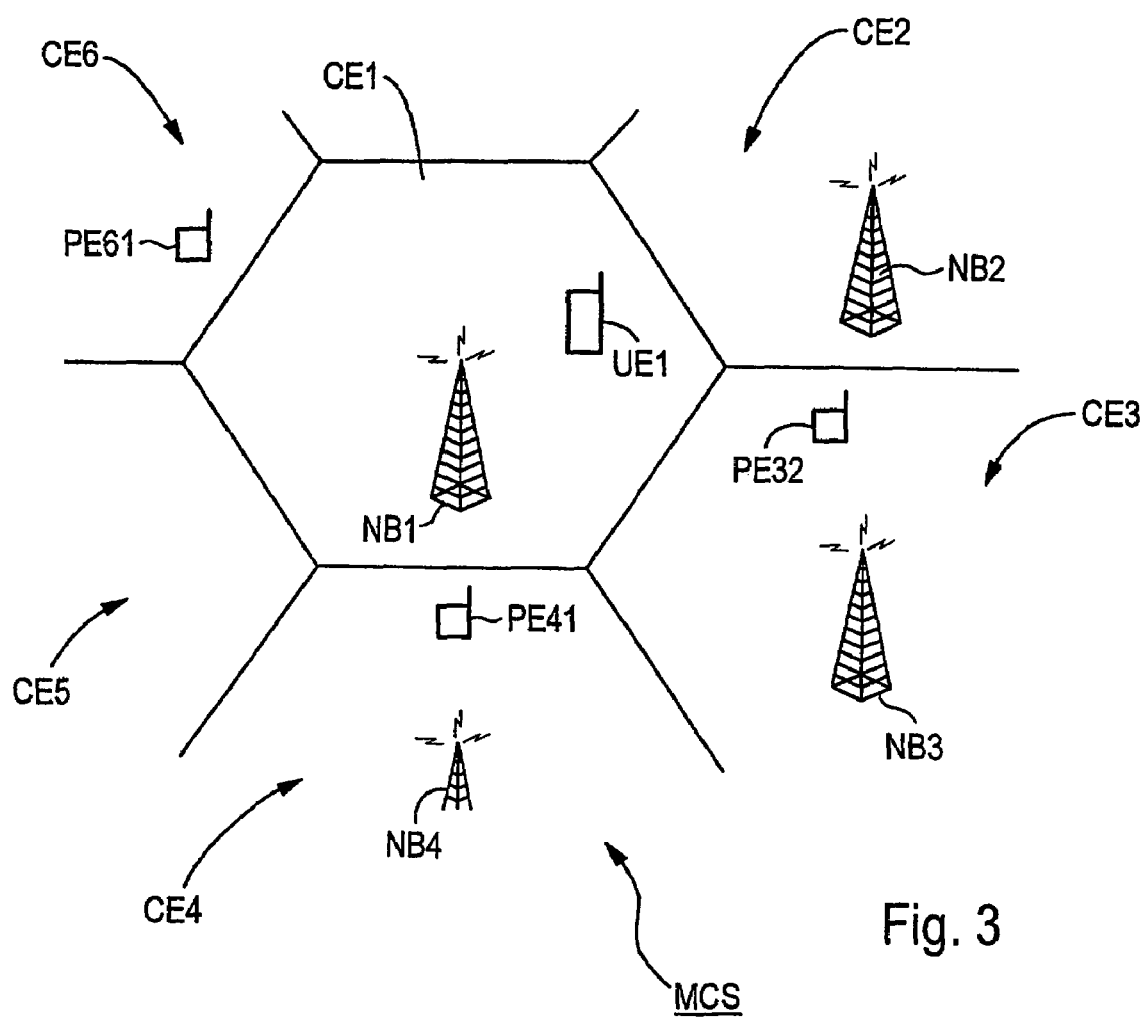
FIG. 3 is a schematic view of a second embodiment of the method according to the present invention for determining the position of a subscriber device of the radio communication system according to FIG. 1.

Exemplary embodiment 2 is related entirely and completely to the above exemplary embodiment 1 and relates to FIG. 3 instead of FIG. 7. The difference is the expansion to 6 UMTS mobile radio cells (CE1 to CE6), and the changed number of PEs and their assignment. There are now three position elements present: PE32 in UMTS mobile radio cell CE3, PE41 in UMTS mobile radio cell CE4, and PE61 in UMTS mobile radio cell CE6. There are no position elements in the UMTS mobile radio cells CE2 and CE5, or in the UMTS radio cell CE1 in which the device is present at that particular time. Here, the following is to apply:
1) The position element PE61 (in UMTS radio cell CE6), PE41 (in UMTS radio cell CE4), and PE32 (in UMTS radio cell CE3) together cover the UMTS cell CE1 in terms of radio equipment.
2) The position element PE61 (in UMTS radio cell CE6), PE41 (in UMTS radio cell CE4), and PE32 (in UMTS radio cell CE3) also respectively cover their own mobile radio cell to a certain extent.
3) The position element PE61 (in UMTS radio cell CE6) additionally covers the upper part of the UMTS radio cell CE5.
4) The position element PE41 (in UMTS radio cell CE4) additionally covers the lower part of the UMTS radio cell CE3 and UMTS radio cell CE5.
5) The position element PE31 (in UMTS radio cell 3) additionally covers the lower part of the UMTS radio cell CE2.

The position of the subscriber device UE1 is determined in a way which is analogous to the descriptions in exemplary embodiment 1. Exemplary embodiment 2 is intended to clarify, in particular, that a different number and arrangement of the position elements (PEs) does not result in any fundamental difference.

Exemplary Embodiment 3

Exemplary embodiment 3 relates entirely and completely to the two previous exemplary embodiments 1 and 2. The difference or the expansion is the use or introduction of pauses in the DL traffic of the NodeB NB1 to the subscriber device UE1 to be located. In specific terms, this means: for the signal code sequences of the PEs of the adjacent UMTS mobile radio cells (CE2 to CE6 in FIG. 3) to be able to be detected largely without any disruptive influences of the NodeB NB1, the DL transmission from the NodeB NB1 to the subscriber device UE1 is switched off for a specific time period, referred to as idle periods. All the corresponding PEs then transmit their signal code sequences precisely in this idle period. The information about the idle period is also provided via the BCH channel. This thus increases the probability of the subscriber device UE1 to be located detecting the corresponding PEs as far as possible (i.e., as far as possible by 100%), and in addition, under certain circumstances, detecting signals from other, more distant PEs. The result would be a qualitatively better determination of position.

Figure 5:
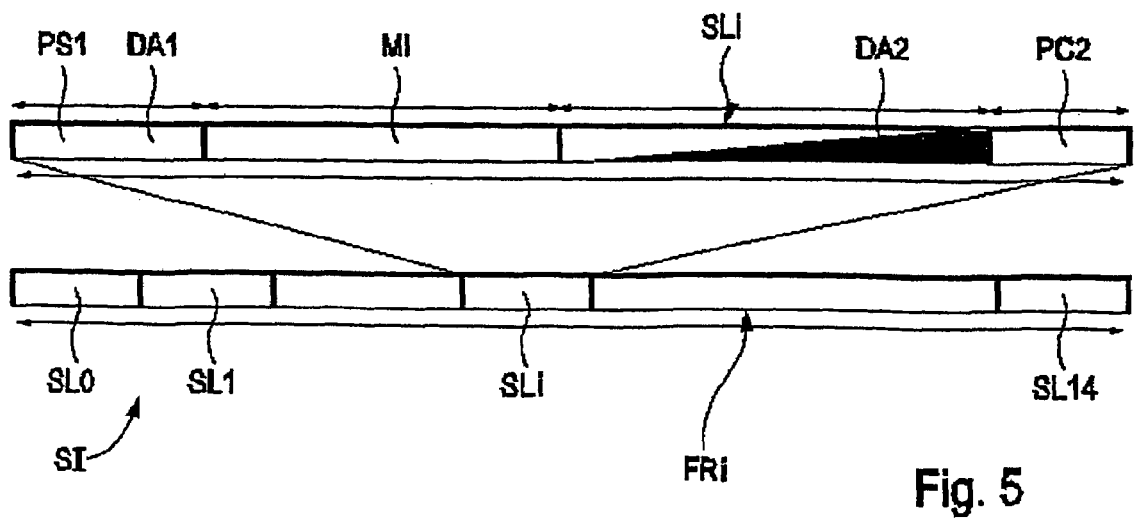
FIG. 5 is a schematic view of the chronological structure of a time frame of the radio signaling on the air interface between a base station and a subscriber device, to be located, of the radio communication system according to the present invention, in accordance with FIGS. 1 and 3, with a locating measuring signal from at least one position element of at least one of the adjacent radio cells having been inserted into this free signal section of a time slot of this time frame according to the method of the present invention.

FIG. 5 shows in a schematic view the chronological structure of a time frame FRi of the radio signaling on the air interface LSi between the base station NB1 and the mobile radio device UE1 to be located, in FIG. 1. Here, in a free signal section of a time slot of this time frame, a position element which is also listening in has inserted a locating measuring signal in one of the adjacent radio cells using the method according to the present invention via either automatic selection or defined assignment in advance. The time frame FRi of the chronological length TF has a number of individual, chronologically successive time slots SL0 to SL14 of respectively the same, constant time period. Such time frames in such a context follow one another in succession; i.e., continuously during the telecommunications transmission. This is indicated in FIG. 5 by, in each case, three points at the start and end of the time frame FRi. The structure of the time frame FRi preferably corresponds to the slot structure of what is referred to as a TDD frame (TDD=Time Division Duplex). A TDD frame such as, for example, FRi is preferably composed here of a total of 15 time slots SL0 to SL14. Here, each time slot can be allocated (i.e., reserved or made available), in a uniquely defined way either for transmissions in the uplink traffic or downlink traffic.

FIG. 5 shows a schematic view of the chronological configuration or the structure (i.e., the chronological division of a time slot) such as, for example, SLi of the time frame FRi. Each respective time slot, such as, for example, SLi has 4 time sections DA1, MI, DA2, PC2 which are reserved for the transmission of various groups of signal types. The first time section DA1 of the time slot SLi is preassigned for the transmission of useful data, referred to as data symbols. Then, in the second, subsequent time section or block MI, what are referred to as midambles are transmitted. These are signals for the channel estimation and/or synchronization of the respective subscriber device and/or of the respective base station. In particular channel equalization in the respective mobile radio device and/or the respective base station is carried out on the basis of these channel estimation parameters. This time block MI is, in turn, followed by a time section DA2 for a further transmission of useful data. By virtue of the fact that the midambles of a channel estimation are transmitted between the two blocks with the useful data or useful signals, it is largely ensured that the respective radio channel can be equalized to an optimum degree when averaged over time. During the fourth, last time section PC2 of the time slots SLi, there is finally no signal transmission; i.e., this so-called guard period is unassigned in order to have a safety time gap between the individual time slots which are transmitted in chronological succession. As a result, in particular, disruptive signal superimpositions or interference between successive slots as a result of signal transit time differences such as, for example, in the case of multi path propagation, are substantially avoided so that satisfactory signal detection is largely ensured. Considered overall, the radio transmission of a so-called burst with predefined chronological division or sectioning therefore can take place during the respective time slot. Detailed information on the time frame structure and time slot structure are given in the respective mobile radio standard, particularly in the UMTS standard here with respect to the exemplary embodiment; for example, 3G TS 25.221 "physical channels and mapping of transport channels onto physical channels (TDD)", version 3.2.0 (2000–03), 3G TS 25.305 "stage 2 functional specification of location services in UTRAN", Version 3.1.0 (2000–03, 3G TS 25.224 "physical layer procedures (TDD)", Version 3.2.0 (2000–03).

In the exemplary embodiment here, the signaling code PS1 of one of the position elements such as, for example, PE11 is transmitted, by way of example, during the time section DA1 in the time slot SLi of the time frame FRi, given that a free signal section is available.

The localization method which is described, by way of example, but with reference to a UMTS radio communication system also can, of course, be applied in other radio communication systems such as, for example, ones according to the GPRS (General Packet Radio Service), or EDGE (Enhanced Data Rates for GSM Environments) standard.

Although the present invention has been described with reference to specific embodiments, those of skill in the art will recognize that changes may be made thereto without departing from the spirit and scope of the present invention as set forth in the hereafter appended claims.

The invention claimed is:

1. A method for determining a position of at least one subscriber device of a radio communication system which has a plurality of base stations, each base station supplying an associated radio cell via at least one air interface, the method comprising the steps of:
   providing one or more radio cells with one or more position elements;
   transmitting at least one locating measuring signal by at least one position element from at least one radio cell which is adjacent to a radio cell in which a subscriber device to be located is present and in which too few or no position elements are present; and
   using the at least one locating measuring signal of the at least one adjacent radio cell having one or more position elements to determine the position of the subscriber device in the radio cell in which the subscriber device is located at a current point in time.

2. A method for determining a position of at least one subscriber device of a radio communication system as claimed in claim 1, wherein signaling on an air interface of the base station of the radio cell in which the subscriber device is located is effected using a time-division multiplex method.

3. A method for determining a position of at least one subscriber device of a radio communication system as claimed in claim 2, wherein the time-divisional multiplex method is a time division duplex mode of a Universal Mobile Telecommunications System standard.

4. A method for determining a position of at least one subscriber device of a radio communication system as claimed in claim 1, the method further comprising the step of assigning a unique identification code to the at least one locating measuring signal.

5. A method for determining a position of at least one subscriber device of a radio communication system as claimed in claim 1, wherein the subscriber device is a mobile telephone.

6. A method for determining a position of at least one subscriber device of a radio communication system as claimed in claim 1, wherein the at least one locating measuring signal is transmitted, during at least one unoccupied signal section, into at least one of signaling traffic of a base station of an assigned radio cell for the at least one position element and signaling traffic of a base station of the radio cell in which the subscriber device is located.

7. A method for determining a position of at least one subscriber device of a radio communication system as claimed in claim 1, wherein the at least one locating measuring signal is transmitted, during a specially inserted quiescent time, into at least one of signaling traffic of a base station of an assigned radio cell for the at least one position element and signaling traffic of a base station of the radio cell in which the subscriber device is located.

8. A method for determining a position of at least one subscriber device of a radio communication system as claimed in claim 1, wherein locating measuring signals of at least two position elements are used for determining the position of the subscriber device to be located.

9. A method for determining a position of at least one subscriber device of a radio communication system as claimed in claim 8, the method further comprising the step of synchronizing the at least two position elements with respect to a timing pattern of radio signaling on an air interface of a base station of the radio cell in which the subscriber device is located.

10. A method for determining a position of at least one subscriber device of a radio communication system as claimed in claim 1, the method further comprising the step of determining and making available for evaluation a transit time of the locating measuring signal for its transit path between its respective position element and the subscriber device to be located.

11. A system for determining a position of at least one subscriber device of a radio communications system, comprising:
    a plurality of base stations associated with a respective plurality of radio cells;
    at least one subscriber device, of the radio communication system, which is to be located;
    at least one position element for transmitting at least one locating measuring signal from at least one radio cell which is adjacent to a radio cell in which the subscriber device to be located is present and in which too few or no position elements are present; and
    a device for using the at least one locating measuring signal of the at least one adjacent radio cell having one or more position elements to determine the position of the subscriber device in the radio cell in which the subscriber device is located at a current point in time.

12. A system for determining a position of at least one subscriber device of a radio communication system as claimed in claim 11, wherein the device for using the at least one locating measuring signal to determine the position of the subscriber device is connected to a base station of the radio cell in which the subscriber device is located.

13. A device for determining a position of at least one subscriber device of a radio communication system as claimed in claim 11, wherein the device for using the at least one locating measuring signal to determine the position of the subscriber device is incorporated into a base station in the radio cell in which the subscriber device is located.

14. A system for determining a position of at least one subscriber device of a radio communication system as claimed in claim 11, wherein the device for using the at least one locating measuring signal to determine the position of the subscriber device is incorporated in the subscriber device to be located.

* * * * *

UNITED STATES PATENT AND TRADEMARK OFFICE
CERTIFICATE OF CORRECTION

| | | |
|---|---|---|
| PATENT NO. | : 7,164,925 B2 | Page 1 of 1 |
| APPLICATION NO. | : 10/484338 | |
| DATED | : January 16, 2007 | |
| INVENTOR(S) | : Siegfried Bär et al. | |

It is certified that error appears in the above-identified patent and that said Letters Patent is hereby corrected as shown below:

On the title page correct PCT information to read as follows:

--(22) PCT Filed: July 1, 2002-- and

--(86) PCT No.: PCT/DE02/02386--

Signed and Sealed this

Twenty-second Day of July, 2008

JON W. DUDAS
*Director of the United States Patent and Trademark Office*